Figure 2:
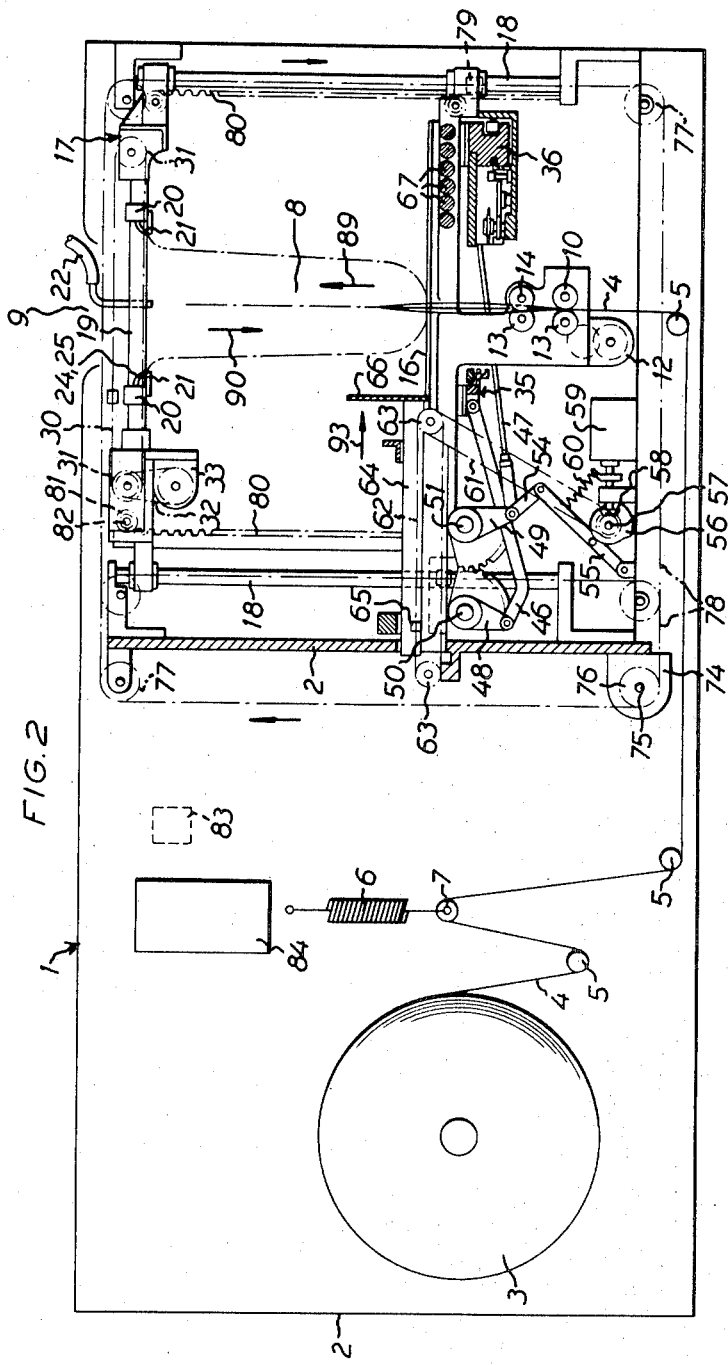

United States Patent [19]

Goransson

[11] 3,792,565
[45] Feb. 19, 1974

[54] WRAPPING MACHINES
[75] Inventor: Pehr Gunnar Heine Goransson, Boras, Sweden
[73] Assignee: Rottneros AB, Karlstad, Sweden
[22] Filed: May 5, 1972
[21] Appl. No.: 250,666

Related U.S. Application Data
[63] Continuation-in-part of Ser. No. 40,572, May 26, 1970, abandoned.

[30] Foreign Application Priority Data
May 27, 1969 Sweden.............................. 7392/69

[52] U.S. Cl.......................... 53/183, 53/386, 53/390
[51] Int. Cl......... B65b 9/00, B65b 5/02, B65b 9/12
[58] Field of Search..... 53/187, 183, 191, 182, 180, 53/245, 385, 386, 390, 134

[56] References Cited
UNITED STATES PATENTS
2,569,711   10/1951   Foster............................... 53/390 X
2,847,806   8/1958   Wang..................................... 53/29
3,070,927   1/1963   Lundahl........................... 53/180 X
3,188,781   6/1965   Aquarius et al....................... 53/180
3,334,466   8/1967   Scholle............................ 53/180 X
3,367,085   2/1968   Parsons........................... 53/134 X
3,579,948   5/1971   Lerner............................. 53/386 X
3,621,638   11/1971   Grocke.................................. 53/386
3,673,765   7/1972   Dohmeier et al..................... 53/187

Primary Examiner—Travis S. McGehee
Assistant Examiner—Horace M. Culver

[57] ABSTRACT

An apparatus for bagging articles to be carried home by the buyer is preferably disposed in a check-out counter and has an upwardly open compartment for the leading portion of a heat sealable material in the form of a tubular foil which is advanced from a supply of such material. The upwardly open compartment in its upper portion has means for keeping the leading end of the tube open and at its lower portion has welding jaws disposed in a vertically adjustable table for conforming the bag to the amount of articles therein.

3 Claims, 6 Drawing Figures

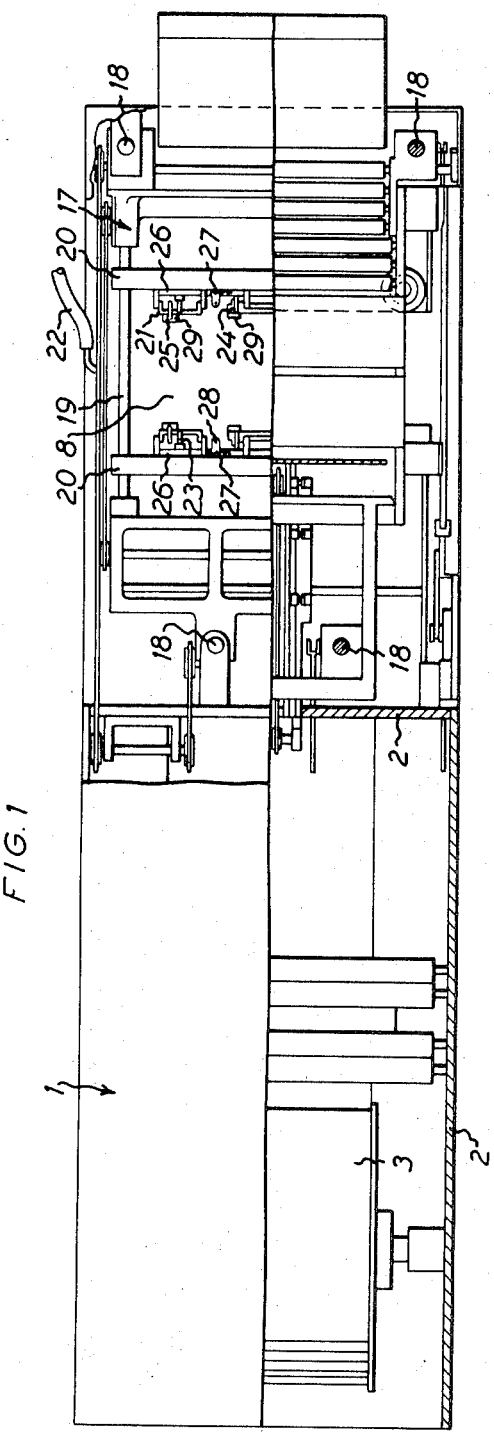
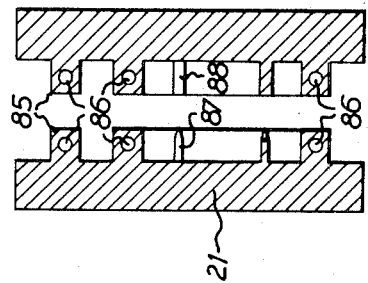
FIG. 1
FIG. 6

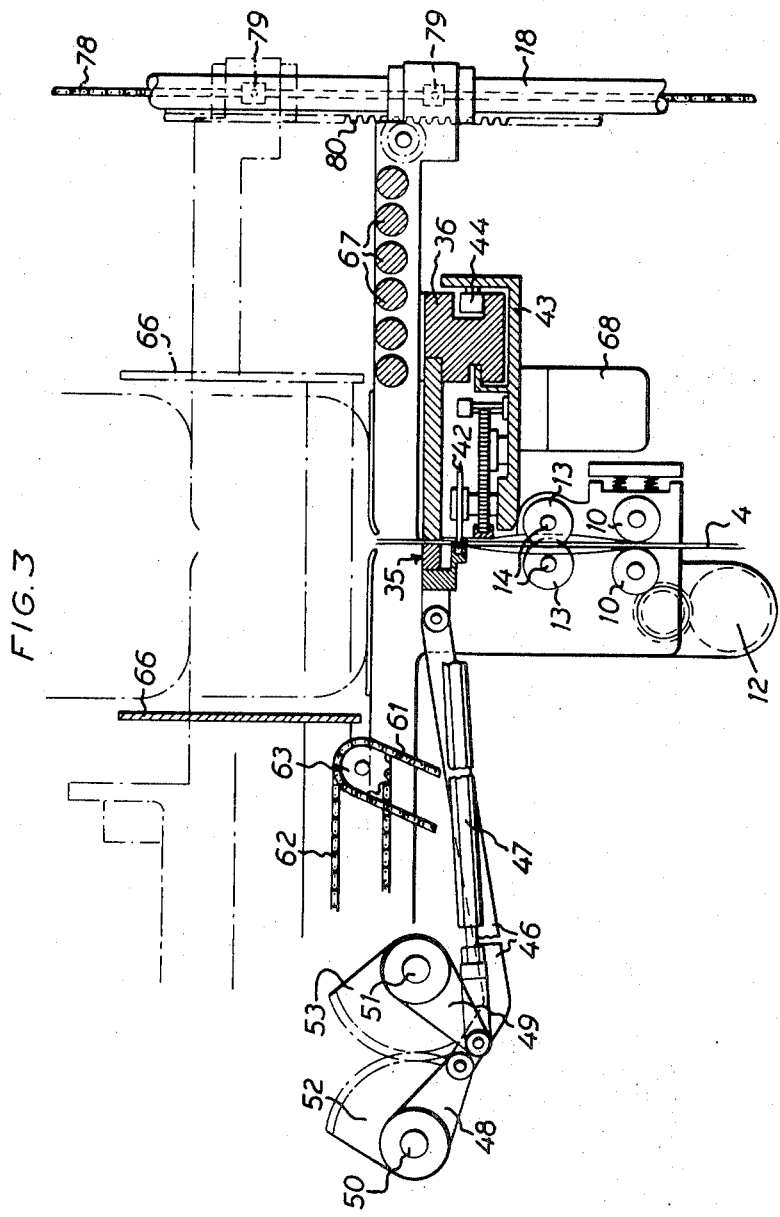

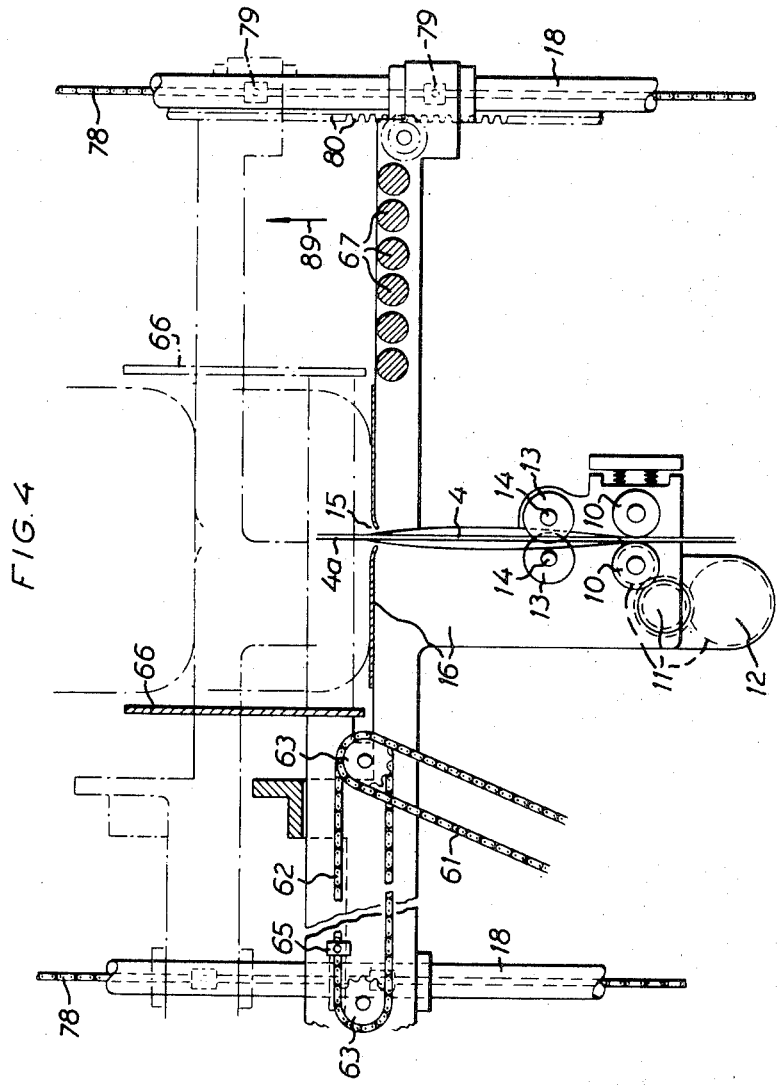

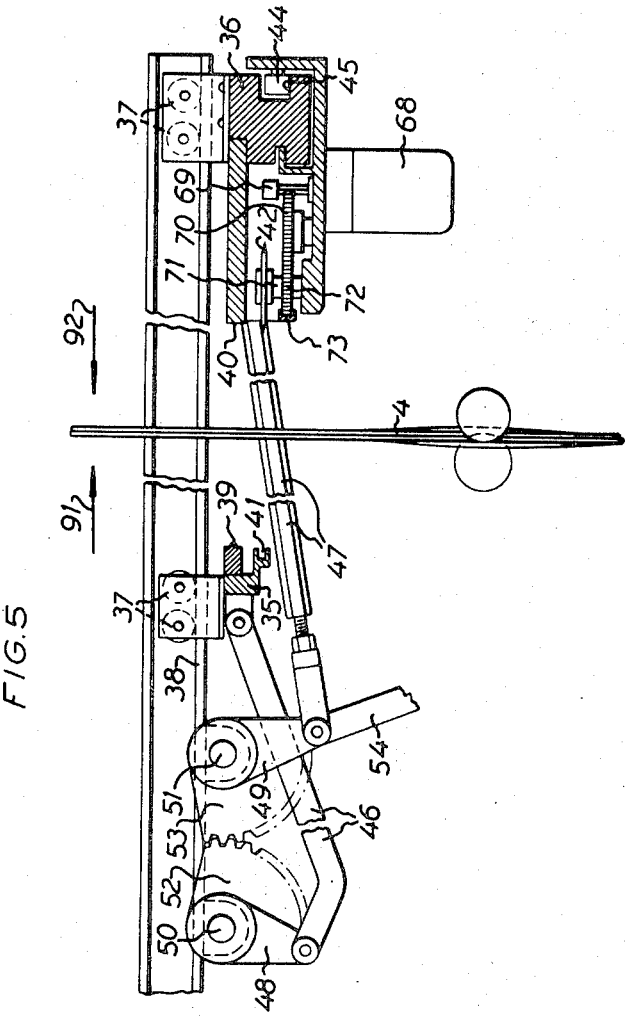

WRAPPING MACHINES

This application is a Continuation-In-Part of U.S. Pat. application No. 40,512 which was filed May 26, 1970, and now abandoned.

This invention relates to an apparatus for bagging articles to be carried home by the buyer is preferably disposed in a check-out counter and has an upwardly open compartment for the leading portion of a heat sealable material in the form of a tubular foil which is advanced from a supply of such material. The upwardly open compartment in its upper portion has means for keeping the leading end of the tube open and at its lower portion has welding jaws disposed in a vertically adjustable table for conforming the bag to the amount of articles therein.

Prior art devices such as disclosed in U.S. Pat. No. 3,070,927 of Lundahl issued Jan. 1, 1963 provide for the packaging of articles by making and filling flexible-walled tubes which, however, are not variable in size.

In U.S. Pat. No. 2,847,806 of Wang which issued Aug. 19, 1958 there is disclosed packing machines in which flattened tubular bag material or plastic foil is fed to a filing station. The bag issued in this patent is closed at its lower end before packaging so that here also there is no variation in bag size.

It is an object of this invention to provide an article bagging or wrapping apparatus for purchases in stores wherein articles can be placed in a single bag by varing the bag size.

It is further object of this invention to provide an article bagging or wrapping apparatus which can more rapidly bag or wrap articles at a check-out counter of a store.

In accordance with this invention there is provided an apparatus for bagging articles disposed at a check-out counter of a store which contains an upwardly open compartment for the leading portion of a heat sealable material in the form of a tubular foil which is advanced from a supply of such material. The upwardly open compartment in its upper portion has means for keeping the leading end of the tube open and at its lower portion has welding jaws disposed in a vertically adjustable table for conforming the bag to the amount of articles therein.

The type of heat sealable foil material which may be used is the kind such as disclosed in U.S. Pat. No. 3,530,642; 3,070,927; 2,847,806 and 3,249,285.

The machine according to this invention is characterized by having sealing jaws which may be arranged to hold the tube closed and are vertically adjustable to adapt the wrapping to the amount of goods contained therein. This feature provides the advantage that the amount of wrapping material required can be reduced to a minimum. In addition, the sealing jaws in combination with the tube material form a goods support which is constantly so adjusted that the goods can be dropped into the open tube without risk of damage. As the tube is being filled, the goods support (i.e., the sealing jaws) is lowered so that the subsequent goods can be dropped into the tube on top of the goods already contained therein. The vertically adjustable jaws thus permit a continuous labor-saving wrapping operation which can be performed manually or mechanically, for instance by means of a conveyor belt.

According to a preferred embodiment, the wrapping machine is provided at the upper portion of the space with jaws adapted to seal the leading end of the tube, preferably at the same time as the vertically adjustable jaws seal the tube. In its finished state, the wrapping as adapted to the amount of goods contained therein thus is in the form of a bag which will not spill its contents, should it be accidently overturned.

An embodiment of the invention will now be described hereinbelow with reference to the accompanying drawings in which:

FIG. 1 is a partial plan view of the apparatus shown in various horizontal sections, FIG. 2 is a vertical section of the apparatus in which the movable parts of the apparatus are in initial position, FIG. 3 is a section of the apparatus in FIG. 2, with the movable parts thereof in other positions, FIG. 4 is a section on a larger scale of a vertically movable table of the apparatus, FIG. 5 is a section on a still larger scale of certain means in the table, FIG. 6 is a section of a welding jaw shown which may be used with this invention.

The bagging apparatus illustrated in the drawings is arranged in a check-out counter 1. The bagging apparatus has a frame 2 in which a supply roll 3 of heat sealable material in the form of a flattened tubular foil 4 of for instance polyethylene or polyethylene-coated kraft paper and like material is arranged. The tubular foil 4 of heat sealable material, hereinafter referred to as "the tube 4," is passed over guide rolls 5 mounted in the frame and a tensioning roll 7 loaded by a spring 6 and keeping the tube 4 stretched. The tube is advanced to a compartment 8 having an opening 9 in the check-out counter. As will appear from the following, articles to be packed are inserted through said opening 9 into the free end of the tube 4 introduced into the compartment 8 and retained and opened therein.

Beneath the compartment 8 the tube 4 is advanced between two opposite feed rolls 10 engaging opposite faces of the tube 4, one roll 10 being drivably connected over a transmission 11 with a motor 12 as shown in FIGS. 1 and 4. Mounted above the feed rolls 10 and similar to said rolls engaging opposite faces of the flattened tube 4 is a pair of shafts 14 which are provided with spaced apart discs 13 and driven by the feed movement of the tube 4 through the bearing engagement of the discs 13 with the tube 4. The discs 13 are so arranged that one disc 13 on one shaft 14 engages between two discs 13 on the other shaft 14. By this engagement of the discs 13 with the tube 4 the latter is folded longitudinally and thus becomes so rigid that the free end 4a of the tube 4 can be pushed upwards into the compartment 8 through a slot 15 in a vertically movable table 16, for purposes that will appear from the following.

The feed rolls 10, the transmission 11, the motor 12 and the shafts 14 with the discs 13 thereon are mounted in the table 16. A vertically movable frame 17 is disposed in the compartment 8 above the table 16 and is mounted in the same guides 18 in the apparatus frame 2 as is the table 16. The frame 17 has guides 19 for two sliding carriages 20 reciprocable in the horizontal sense. The sliding carriages 20 support welding jaws 21 connected to a suitable source of power, suction cups 23 connected through hoses 22 to a suitable source of vacuum and an operating mechanism, and gripping means 24 and 25. The gripping means 24 are disposed directly in the respective sliding carriage 20 while the grippers 25 are disposed on members 26 which are pivotally mounted under and against the action of springs 27 on shafts 28 in the respective sliding carriage 20. The grippers 24 and 25 are adapted to swing towards and away from abutments 29 in order to grip and retain in cooperation with these abutments 29 the mouth portion area of the free end 4a of the tube 4, as will appear from the following.

For its reciprocation in the horizontal sense one sliding carriage 20 is connected to one run of an endless chain 30 which is passed over sprocket wheels 31. The other carriage 20 is connected to the other run of the chain 30. One sprocket wheel 31 is drivably connected over a transmission 32 with a motor 33 of reversible direction of rotation.

Two carriages 35, 36 are movable towards and away from one another in with one beneath the table 16 and to this end are supported by rollers 37 which run on a flange 38 in the table. Both carriages 35, 36 have cooperating welding jaws 39, 40. Moreover, the carriage 35 has a groove 41 beneath its welding jaw 39. The other carriage 36 has a circular knife 42 which in a given position of the carriages 35, 36 engages in said groove 41. The circular knife 42 is disposed in an auxiliary carriage 43 which by means of rollers 44 running in grooves 45 in the carriage 36, is movable transversely of the tube 4 when the knife engages in the groove 41. The carriages 35, 36 are drivably connected, through links 46, 47, each with one crank 48, 49 which are arranged each on one shaft 50 and 51, respectively, in the table 16. Toothed segments 52, 53 meshing with one another are secured to the shafts 50, 51. The crank 49 is pivotally connected by a link 54 with one end of an arm 55 which has its other end mounted in the table 16. A cam 56 on a shaft 57 engages the arm 55, and the shaft 57 is in driving connection over a bevel gearing 58 with an electric motor 59. The arm 55 is kept engaged with the cam 56 by a spring 60.

The shaft 57 is in driving connection with a reciprocating rod 64 over a transmission formed by chains 61, 62 and sprocket wheels 63. The rod 64 to this end has a dog 65 which engages one run of the chain 62. The rod 64 is connected to a vertical plate 66. Rollers 67 are mounted on the part of the table opposite to the plate 66.

To be rotated and reciprocated along the groove 41 in the second carriage 35 while engaging the groove 41, the circular knife 42 mounted in the carriage 36 is in driving connection with a motor 68 in the auxiliary carriage 43. The motor 68 has a pinion 69 which is in mesh with an intermediary wheel 47 in the auxiliary carriage 43, which wheel in turn is in mesh with a gear wheel 72 secured to the shaft 71 of the circular knife 42. This gear wheel 72 also meshes with a rack 73 secured in the auxiliary carriage 43.

A motor 74 is mounted in the apparatus frame 18 to vertically reciprocate the table 16 and the frame 17. A sprocket wheel 76 is mounted on the shaft 75 of said motor 74 and a pair of endless chains 78 are passed over said sprocket 76 76y and further sprocket wheels 77 in the apparatus frame 18, said chains engaging the table 16 by means of dogs 79 provided on the chains 78. Racks 80 secured in the apparatus frame 18 are arranged to drive the frame 17 and gear wheels 81 in the frame 17 mesh with said racks and are drivably connected with a motor 82 in a manner not shown.

The apparatus has a manually actuable operating mechanism 83 which is connected to a suitable source of power and to a current distributor 84 to which the motors of the apparatus are connected.

The welding jaw 21 which is disposed in the frame 17 and one sliding carriage 20 thereof, is provided with welding surfaces 85 which are heated by electrical resistance elements 86, and a knife-blade 87 (FIG. 6). The welding jaw in the other sliding carriage 20 has abutments 88 cooperating with the knife-blade 87, all for purposes to be described in the following.

The apparatus described in the foregoing operates in the following manner:

Assuming that the bagging apparatus has completed a bagging cycle and that a further bagging cycle is to be initiated from the initial position of the apparatus shown in FIG. 2, the operator actuates the operating mechanism 83 so that the current distributor 84 is made active and conducts current to the motors 74 and 82 which cause the table 16 to move in the direction of the arrow 89 and the frame 17 to move in the direction of the arrow 19. The table 16 and the frame 17 thus move towards one another in the initial phase of the bagging cycle. During the movement of the table 16 in the direction of the arrow 89 the motor 12 is also made active and over the transmission 11 actuates the feed rolls 10 which push the free end 4a of the tube 4 through the slot 15 in the table 16 so that it emerges over said table 16. At the same time as the frame 17 is caused to move in the direction of the arrow 19, the motor 33 is made active and moves the sliding carriages 20 in the frame 17 toward one another over the transmission 32. When the frame 17 and thus the sliding carriages 20 are on a level with the free end 4a of the tube 4 protruding above the table 16, the suction cups 23 have reached the tube 4 or the immediate vicinity thereof and adhere to it. When the suction cups 23 have sucked to them the opposite faces of the tube at the free end 4a thereof the direction of rotation of the motor 33 is reversed by the current distributor 84 so that the sliding carriages 20 are caused to move away from one another simultaneously as the gripping means 24 and 25 engage and retain the free end 4a of the tube 4. The table 16 remains stationary for the time being, while the frame 17 returns to the initial position shown in FIG. 2. During the movement of the frame to the initial position the tube 4 is carried along and moved through the slot 15. In the end position of the frame 17 immediately below the opening 9 of the compartment 8 the frame 17 and the sliding carriages 20 with the members 26 occupy the position shown in which the tube 4 is well opened and articles can readily be packaged in the portion of the tube situated in the compartment 8 by introducing said articles into the tube 4 and the compartment 8 through the opening 9 thereof. The table 16 supports the articles and relieves the tube 4 and the gripping means 24, 25 of load.

As the amount of articles increase in the portion of the hose situated in the compartment 8 the table 16 is lowered in the direction of the arrow 90. The movement of the table 16 is interrupted when the desired number of articles has been bagged in the tube portion situated in the compartment 8. In the lowermost position of the table or an intermediary position thereof, depending upon the number of articles in the tube, the motor 33 is made operative by the current distributor 84 in a sense implying that the sliding carriages 20 move towards one another, the pivotal members 26 returning under the action of the springs 27 to their initial position illustrated in the upper right-hand portion of FIG. 1. The sliding carriages 20 are moved so close together that the tube 4 is clamped between the welding jaws 21 of the sliding carriages 20 simultaneously as the gripping means 24, 25 release their grip about the mouth portion of the tube 4.

At the same time as the sliding carriages 20 in the frame 17 are moved towards one another the motor 59 is made operative and actuates via shaft 57, gearing 58 and cam 56 the arm 55 which via link 54, toothed segments 52, 53, shafts 50, 51, cranks 48, 49 and links 46, 47 move the carriages 35, 36 towards one another in the direction of the arrows 91 and 92. At the end of this movement the tube is flattened in an area beneath the compartment 8 and the table 16 between the welding jaws 39, 40 arranged on the carriages 35, 36. If the number of articles in the tube portion situated in the compartment 8 is small the table 16 is returned to the initial position shown in FIG. 2 simultaneously as the frame 17 moves in the same direction as the table. This takes place largely at the same time as the welding jaws 21 in the frame 17 and the welding jaws 39, 40 are pressed against the tube. In these positions of the table 16 and the frame 17 current is conducted to all welding jaws 21, 39, 40, whereby the tube is welded together and sealed. During this welding operation the motor 68 is made operative. This causes the auxiliary carriage 43 to move and the circular knife 42 in the groove 41 to rotate into engagement with the tube portions lying between the circular knife 42 and the parts of the carriage 35 defining the groove 41, all of which results in that the tube portion situated in the compartment 8 is separated from the remaining tube. The actuation of the motor 59 also results in that the shaft 57 via the transmission formed by the chains 61 and 62, the sprocket wheels 63 and the dogs 65 moves the rod 64 in the direction of an arrow 93 (FIG. 2) whereby the plate 66 is moved in the same direction. The movement of the plate 66 is so dimensioned that it does not commence to move a bag lying on the table until this bag has been separated from the remaining tube by the circular knife 42. The plate 66 moves the bag onto the rollers 67 from which the finished bag can be removed.

As is apparent from the foregoing the welding jaws 21 in the frame 17 and thus in the upper portion of the compartment 8 have realized a weld pattern at the mouth portion of the bag formed while the welding jaws 39 and 40 in the table 16 realize a weld forming the bottom of the bag. Also, the welding jaws 21 make a cut in the bag by means of the knife-blade 87 and the abutment 88, and through said cut a person can insert his one hand and utilize the portion of the bag situated above the cut as a handle when the finished bag is lifted away from the rollers 67 in the table 16. The tubular starting material may be provided with side folds.

Obviously, the embodiment shown is exemplary only and a wide variety of embodiments may be devised without departing from the spirit and scope thereof.

What is claimed is:

1. An apparatus for bagging articles handled at a check-out counter, comprising a housing, a bagging compartment in said housing, a top wall of said housing, means defining an opening in said top wall giving access from above to said bagging compartment, a carriage assembly in said bagging compartment vertically movable towards and away from the opening in said top wall, supply means mounted in said housing for supplying rolled flattened tubular foil of heat sealable material to said carriage assembly, bag supporting means on said carriage assembly, means forming a slot in said bag supporting means, feeding and guiding means mounted on said carriage assembly below said bag supporting means for feeding an end portion of the flattened tubular foil upwards through the slot in said bag supporting means towards the opening in said top wall, gripping means mounted in said housing between the opening in said top wall and said carriage assembly for opening and gripping the end of the tubular foil fed upwards through the slot in said bag supporting means, said means forming the slot in said bag supporting means maintaining the tubular foil in substantially flattened condition in the region of said bag supporting means, and bag bottom forming means mounted on said carriage assembly below said bag supporting means for forming a sealed bag bottom by heat sealing the tubular foil in flattened condition along a line transverse to the longitudinal direction of the tubular foil and for severing the bag bottom formed from the length of flattened tubular foil extending from the bag bottom towards said supply means.

2. An apparatus according to claim 1 further comprising motor driven means mounted in said housing and connected to said carriage assembly for reciprocating said carriage assembly in vertical direction.

3. An apparatus according to claim 1 in which said feeding and guiding means comprise a motor driven roller pair mounted on said carriage assembly for engaging and feeding the flattened tubular foil upwards, two shafts mounted on said carriage assembly above said motor driven roller pair, and spaced apart discs on each of said shafts, said discs on one of said shafts protruding into the spaces between said discs on the other shaft, said shafts and discs being positioned to engage the flattened tubular foil fed from said roller pair from opposite sides, give the foil a wave shape and guide the foil towards and through the slot in said bag supporting means.

* * * * *